United States Patent Office 3,524,476
Patented Aug. 18, 1970

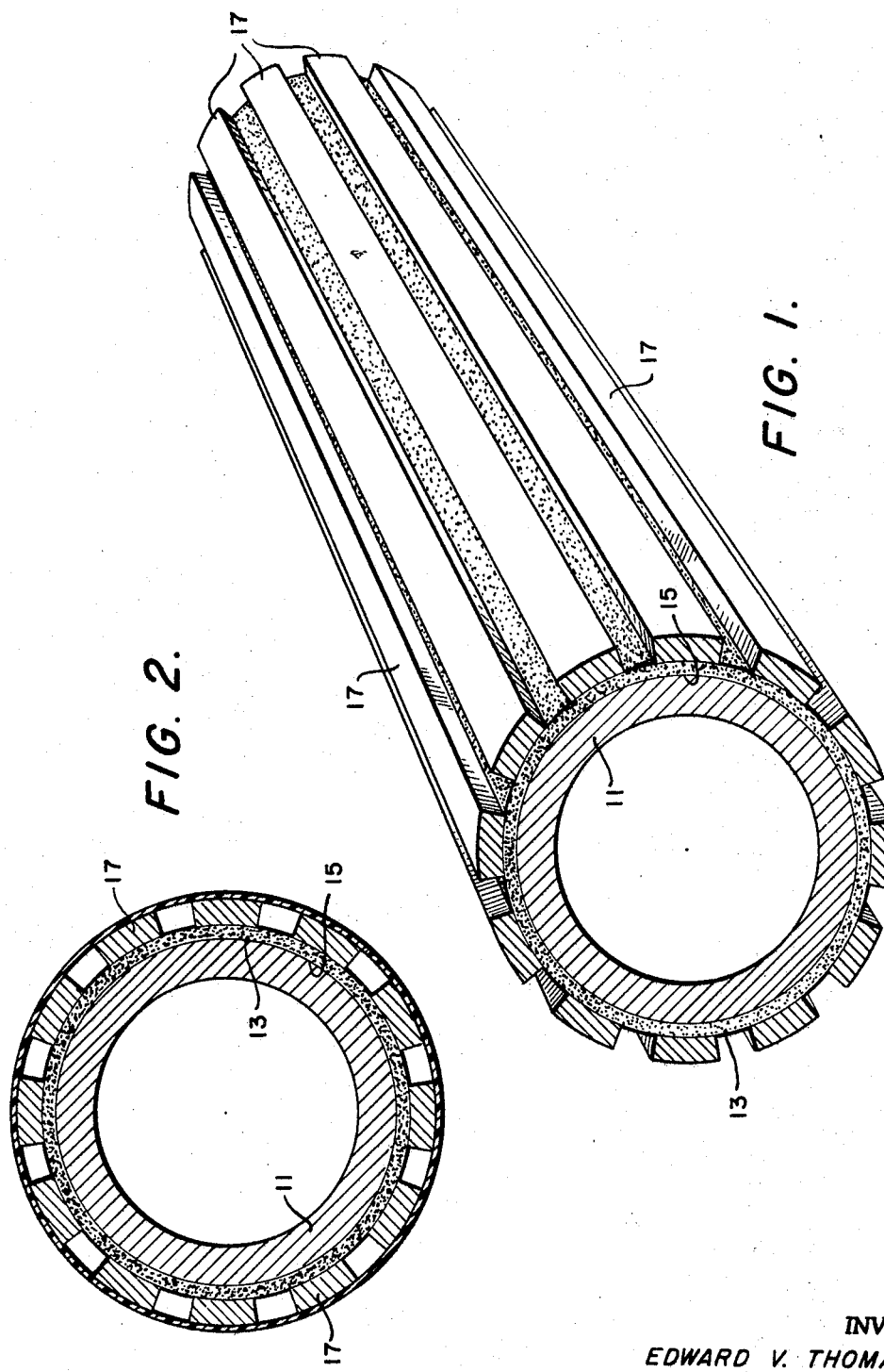
INVENTOR
EDWARD V. THOMAS

3,524,476
PIPE WALL SHEAR DAMPING TREATMENT
Edward V. Thomas, Severna Park, Md., assignor to the United States of America as represented by the Secretary of the Navy
Filed Sept. 28, 1967, Ser. No. 671,501
Int. Cl. F16l 55/02, 55/04
U.S. Cl. 138—103                                 4 Claims

ABSTRACT OF THE DISCLOSURE

A hollow part such as metal pipe carrying high pressure fluid is surrounded by an adhesive viscoelastic cylinder of high dynamic shear upon which are laid spatially separated staves of metal. The staves act as shear strain inducers on the viscoelastic material converting the pipe wall vibration to heat and damping the modal motions of the pipe.

The invention described herein may be manufactured and used by or for the Government of the United States of America for governmental purposes without the payment of any royalties thereon or therefor.

BACKGROUND OF THE INVENTION

The present invention relates to acoustic damping and more particularly to attenuating acoustic vibrations in piping. Prior art arrangements for attenuating acoustic pressure pulsations in piping systems are phase cancellation or absorption type acoustical filters. These prior methods for damping acoustical pulsations in high pressure piping have not been particularly effective to reduce noise appreciably.

The purpose of the present invention is to provide a high degree of vibration damping to fluid carrying piping systems particularly of the type carrying high pressure pulsating fluids, particularly steam, high pressure air and lubricating oil. More specifically, the invention aims to reduce both the bending mode dynamic response and the lobar mode response of the pipe. By "bending mode" is meant the lengthwise bending of the pipe and by "lobar mode" is meant the distortion of the pipe walls causing the pipe in transverse cross section to distort out of round.

It is known that the lobar mode vibrations caused by fluid pulsations are of a higher frequency than bending mode vibrations. The higher frequencies cause greater noise in relation to input energy and are the more troublesome to eliminate.

SUMMARY OF THE INVENTION

The present invention substantially reduces pipe noise caused by bending and especially lobar modes by providing a viscoelastic material surrounding the pipe in intimate contact therewith, and a plurality of discrete shear strain-inducing elongated bodily elements located on the viscoelastic material. As the pipe vibrates, the strain-inducing elements with the viscoelastic material effectuating tuned damped vibration absorption and vibrate also, causing the viscoelastic material between the vibrating pipe and elements to encounter shear forces producing heat. The heat thus generated represents dissipation of vibrational energy of the pipe. This loss of vibrational energy in the pipe wall attenuates the acoustic pressure energy in the entrained fluid as it passes thru the pipe.

BRIEF DESCRIPTION OF THE DRAWINGS

For a better understanding of the invention reference is made to the accompanying drawings in which like reference numerals represent like parts and in which:

FIG. 1 is a view in perspective of one embodiment of the invention; and
FIG. 2 is a view in transverse cross section of a modification of the arrangement shown in FIG. 1.

DESCRIPTION OF THE PREFERRED EMBODIMENT

In FIG. 1 a metallic pipe 11 which typically is fabricated of steel or like material having elastic properties. A viscoelastic material 13 is molded or applied in sheet form to the outside surface 15 of the pipe wall in intimate contact therewith. The viscoelastic material surrounding the pipe is of thickness to exhibit shear strain, of the order of about one millimeter or more, depending upon the particular viscoelastic material used. In some instances a thin, "painted on" coating of viscoelastic material may be sufficient, as described in U.S. Pat. No. 3,169,881 to Bodine, to exhibit shear strain.

Some viscoelastic materials are non-hardening, tacky and adhesive in characteristics. In combination with such materials a plurality of metallic axial staves 17 are pressed into place at spaced apart locations on the viscoelastic material and adhesively held thereby. The mass of each stave is approximately proportional to the mass of the pipe so that, in general, the heavier the pipe, the heavier the staves.

Alternatively, as shown in FIG. 2, where non-adhesive viscoelastic material is employed for shear damping, the axial staves 17 may be held in place by a thin plastic tube 19 of any suitable compliant heat such as 2,000 type HST Teflon FEP fluorocarbon tubing made by E. I. Du Pont, enabling shrink fit of the tube over the staves 17 to hold them firmly in place.

As a further alternative, the plastic tubing 19 may be replaced by a plurality of circumferentially or helically wound tapes or steel straps which, as shown in FIG. 2, have the same relation as does the tube 19 in holding the staves 17 in place.

Examples of particular viscoelastic materials which may be employed at 15 are:

(a) Zinc chromate impregnated wool felt gasket material
(b) Minnesota Mining and Manufacturing #466 viscoelastic film (adhesive)
(c) General Electric high temperature silicon rubber RTV 8112 (non-adhesive)

DESCRIPTION OF THE OPERATION

In operation the viscoelastic material 13 resists the vibration of the pipe 11 and staves 17, and molecular resistive reaction to shear strain thereon attenuates the pipe noise. The acoustic energy in the pipe is thus transformed into heat energy in the viscoelastic material. The compliant outer tube 19 does not appreciably affect the vibration characteristics of the metallic staves 17. Consequently the operation of the FIG. 2 embodiment is essentially the same as that of FIG. 1.

When steel bands are employed at 19 to hold the staves 17 in place, the mechanical separation of the staves is somewhat reduced, without, however, deleteriously affecting the essential vibration damping chacteristics of the invention arrangement.

While the present invention has been directed primarily toward reducing noise in piping which is usually circular in transverse cross section, it is to be understood that conduits or chambers of other cross sectional shapes may be damped inward or outward.

Further, in the operation of the present invention the axial staves provide shear strain in the viscoelastic material for bending (longitudinal) modes of the pipe and thus should be as stiff as possible in relation to the pipe. The inertia of the staves provides shear strain in the viscoelastic material for lobar modes and for "breathing" or "accordion" modes, that is, modes that are both diametric and longitudinal.

The damping arrangement, i.e., tuned damped vibration absorption, of the present invention provides a broad frequency range of damping. For example, with a steel pipe of about ½ inch thickness and 4–6 inches outside diameter, appreciable attenuation occurs in the band of from about 1,000 c.p.s. to 10,000 c.p.s. and additional attenuation in the higher frequency "breathing" modes. Attenuation of lower frequency bending modes can be increased by providing thicker staves within local weight limitations.

Obviously many modifications and variations of the present invention are possible in the light of the above teachings. It is therefore to be understood that the invention may be practiced otherwise than as specifically described.

What is claimed is:
1. Apparatus for damping bending, lobar and breathing vibrations occurring in an elongated hollow body such as pipe having a central axis comprising:
   a thin layer of viscoelectric material disposed in intimate contact with one of the surfaces of the pipe;
   a plurality of axially disposed, elongated stiff bodies located at peripherally spaced apart positions on said layer, each of said bodies having a mass corresponding to that of the pipe, so that the heavier the pipe, the heavier the bodies, for inducing, responsive to vibration of the pipe, shear strain on said viscoelastic material and in conjunction with said material, tuned damped vibration absorption within a predetermined broad frequency range.

2. Apparatus according to claim 1 including additional means attached to said plurality of elongated bodies for securing said bodies to said viscoelastic material.

3. Apparatus according to claim 2 wherein the surface of the pipe is the outer surface and wherein said additional means comprises a tube of shrunk fit compliant plastic material.

4. Apparatus according to claim 3 wherein the pipe and said elongated bodies are metallic.

References Cited

UNITED STATES PATENTS 3,169,881  2/1965  Bodine _____ 181—33 X
3,206,228  9/1965  Burrell _____ 138—174 X

FOREIGN PATENTS 513,171  10/1939  Great Britain.

HOUSTON S. BELL, Jr., Primary Examiner

U.S. Cl. X.R.

138—174; 181—33